(12) United States Patent
Kim et al.

(10) Patent No.: US 12,502,050 B2
(45) Date of Patent: Dec. 23, 2025

(54) SHOE CARE APPARATUS

(71) Applicant: SAMSUNG ELECTRONICS CO., LTD., Suwon-si (KR)

(72) Inventors: Daegeon Kim, Suwon-si (KR); Hakjae Lee, Suwon-si (KR); Dongpil Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 398 days.

(21) Appl. No.: 18/327,452

(22) Filed: Jun. 1, 2023

(65) Prior Publication Data

US 2023/0320560 A1 Oct. 12, 2023

Related U.S. Application Data

(63) Continuation of application No. PCT/KR2021/019082, filed on Dec. 15, 2021.

(30) Foreign Application Priority Data

Jan. 29, 2021 (KR) .................. 10-2021-0013575

(51) Int. Cl.
*A47L 23/20* (2006.01)
*A61L 9/12* (2006.01)
*B01F 23/21* (2022.01)

(52) U.S. Cl.
CPC .............. *A47L 23/20* (2013.01); *A61L 9/12* (2013.01); *B01F 23/21* (2022.01);
(Continued)

(58) Field of Classification Search
CPC ................................. A47L 23/20; B01F 23/21
See application file for complete search history.

(56) References Cited

U.S. PATENT DOCUMENTS

2022/0313061 A1 10/2022 Kim et al.

FOREIGN PATENT DOCUMENTS

| CN | 203700812 U | 7/2014 |
|---|---|---|
| CN | 203569349 U | 8/2014 |

(Continued)

OTHER PUBLICATIONS

International Search Report (PCT/ISA/210) issued in International Application No. PCT/KR2021/019082 dated Apr. 12, 2022.
(Continued)

*Primary Examiner* — Robert A Hopkins
(74) *Attorney, Agent, or Firm* — STAAS & HALSEY LLP

(57) ABSTRACT

A shoe care apparatus may include a cabinet; a care chamber inside the cabinet; a machine room to supply air to the care chamber and including an inlet through which air is introducible and an outlet through which air is dischargeable, so as to allow air to circulate the care chamber and the machine room through a flow path. A recovery chamber may be configured to allow air from the care chamber to be guided to the inlet of the machine room and be introduced into the machine room. A fragrance emitter holder in the recover chamber may accommodate a fragrance emitter configured to add fragrance to the air from the care chamber that is guided through the recovery chamber, so that the air to which the fragrance is added by the fragrance emitter is supplied to the care chamber through the flow path.

15 Claims, 15 Drawing Sheets

(52) U.S. Cl.
CPC .... *A61L 2209/111* (2013.01); *A61L 2209/133* (2013.01); *A61L 2209/15* (2013.01)

(56) References Cited

FOREIGN PATENT DOCUMENTS

| | | | | |
|---|---|---|---|---|
| CN | 203748930 U | | 8/2014 | |
| CN | 204146627 U | | 2/2015 | |
| CN | 206025666 U | * | 3/2017 | |
| CN | 107898157 A | * | 4/2018 | ........... A47L 23/205 |
| CN | 209825739 U | | 12/2019 | |
| CN | 210520421 U | | 5/2020 | |
| CN | 211910938 U | | 11/2020 | |
| JP | 11-155657 | | 6/1999 | |
| JP | 2001-327341 | | 11/2001 | |
| JP | 2003-116652 | | 4/2003 | |
| JP | 2003-265897 | | 9/2003 | |
| JP | 4833595 | | 9/2011 | |
| JP | 2020-199239 | | 12/2020 | |
| KR | 92-5264 | | 3/1992 | |
| KR | 1992-0005264 | | 7/1992 | |
| KR | 2001-0010936 | | 2/2001 | |
| KR | 20-0388257 | | 6/2005 | |
| KR | 20-0413838 | | 4/2006 | |
| KR | 20-0440865 | | 7/2008 | |
| KR | 10-2010-0023322 | | 3/2010 | |
| KR | 10-0996307 | | 11/2010 | |
| KR | 100996307 B1 | * | 11/2010 | ........... A47L 23/205 |
| KR | 20-0457674 | | 1/2012 | |
| KR | 10-2016-0001224 | | 1/2016 | |
| KR | 10-1626875 | | 6/2016 | |
| KR | 20-0481915 | | 11/2016 | |
| KR | 10-2021-0085188 | | 7/2021 | |
| WO | WO 2021/137389 A1 | | 7/2021 | |

OTHER PUBLICATIONS

Written Opinion (PCT/ISA/237) issued in International Application No. PCT/KR2021/019082 dated Apr. 12, 2022.
Extended European Search Report issue in counterpart European 21923428.3 dated Apr. 3, 2024.

* cited by examiner

SHOE CARE APPARATUS

CROSS-REFERENCE TO RELATED APPLICATIONS

This application is a continuation of International Application No. PCT/KR2021/019082, filed Dec. 15, 2021, which claims priority to Korean Patent Application No. 10-2021-0013575, filed Jan. 29, 2021, the disclosures each of which are incorporated herein by reference.

BACKGROUND

1. Field

The disclosure relates to a shoe care apparatus, and more particularly, to a shoe care apparatus including a fragrance emitter holder.

2. Description of Related Art

Shoes are worn on the feet when walking or exercising, and the shoes may be contaminated by soil or dirt, and may also be contaminated by sweat. Therefore, it is required to periodically wash the shoes for the comfortable use. However, because shoes include a part that directly touches the floor, a degree of contamination is typically greater than that of clothes and thus it is difficult to wash the shoes and the clothes together.

In addition, unlike general clothes, shoes include various parts such as an upper, a midsole, an outsole, an insole, a tongue, a heel cup, and a heeltap. Further, according to the purpose of each part, various materials may be applied to each part. For example, a relatively hard material may be applied to a midsole, an outsole, and/or a heel cup, and a relatively soft material may be applied to an insole and a heel tab. Shoes have a relatively complex structure, and thus it is not easy to care for the shoes with a conventional clothes care apparatus.

In addition, as the size of the resell market for limited edition shoes has recently increased, consumers' interest in the limited-edition shoes is increased, and there is a growing need of a device for easy care for the limited-edition shoes.

SUMMARY

One aspect of the present disclosure provides a shoe care apparatus including a cabinet; a care chamber inside the cabinet; a machine room to supply air to the care chamber and including an inlet through which air is introducible and an outlet through which air is dischargeable so as to allow air to circulate the care chamber and the machine room through a flow path; a recovery chamber configured to allow air from the care chamber to be guided to the inlet of the machine room and be introduced into the machine room; and a fragrance emitter holder in the recovery chamber to accommodate a fragrance emitter configured to add fragrance to the air from the care chamber that is guided through the recovery chamber, so that the air to which the fragrance is added by the fragrance emitter is supplied to the care chamber through the flow path.

The shoe care apparatus may further include a separation shelf detachably mounted to the cabinet to form the recovery chamber. The fragrance emitter holder may be installed on a bottom surface of the separation shelf.

The bottom surface of the separation shelf may be spaced apart from the inlet of the machine room by a distance in an upper to lower direction of the cabinet so as to face the inlet of the machine room.

The bottom surface of the separation shelf may include a first area corresponding to the inlet of the machine room and a second area outside the first area. The fragrance emitter holder may be in the second area.

The fragrance emitter holder may be spaced apart from the inlet of the machine room by a distance in a left to right direction of the cabinet.

The separation shelf may include a grille on a front portion of the separation shelf to allow the air from the care chamber to be guided to the inlet of the machine room.

The inlet of the machine room may be located behind the grille. As the air inside the care chamber is allowed to pass through the grille and be guided to move rearward in the recovery chamber to the inlet of the machine room, the fragrance emitted from the fragrance emitter holder may be added to the air, and the air with fragrance may be introduced into the machine room through the inlet of the machine room.

The fragrance emitter holder may extend in a front to rear direction of the bottom surface of the separation shelf.

The shoe care apparatus may further include a supply duct configured to move air discharged from the outlet of the machine room to the care chamber. The supply duct may be included on a side wall of the care chamber. The supply duct may include an end for the air to flow from the outlet of the machine room and an other end for the air to flow to the care chamber.

The flow path may include a first passage inside the recovery chamber; a second passage inside the machine room; and a third passage inside the supply duct. Air inside the cabinet may circulate through the first passage, the second passage, the third passage, and the care chamber.

The fragrance emitter holder may include a seating portion on which the fragrance emitter is to be seated; and a cover to open and close the seating portion.

The fragrance emitter holder further may include a hinge portion and the cover opens and closes the seating portion by being rotatable around the hinge portion.

The shoe care apparatus may further include a coupling portion formed outside the seating portion. The coupling portion may include a locking protrusion protruding from a bottom surface of the separation shelf. The cover may include a locking protrusion corresponding portion corresponding to the locking protrusion. When the locking protrusion and the locking protrusion corresponding portion are coupled, the cover may cover the seating portion to be set into a locked state. In the locked state, a gap may be in at least a portion between the seating portion and the cover.

The cabinet may include an outer case and an inner case, and the fragrance emitter holder may be detachably mounted on the inner case in the recovering chamber.

The shoe care apparatus may further include at least one sensor to detect fragrance inside the care chamber.

The shoe care apparatus may display status information of fragrance detected by the sensor.

The shoe care apparatus may perform a fragrance replacement notification function based on status information of fragrance detected by the at least one sensor.

Another aspect of the present disclosure provides a shoe care apparatus including: a cabinet having an outer case and an inner case; a care chamber formed by the inner case; a machine room provided below the care chamber, the machine room including an inlet through which air is introduced from the care chamber, a heat exchanger disposed to exchange heat with air introduced through the inlet, and an outlet through which air heat-exchanged through the heat exchanger is discharged; a recovery chamber partitioned from the care chamber and communicating with the care chamber and the machine room to allow air from the care chamber to be guided to the inlet of the machine room; a supply duct extending vertically between the outer case and the inner case on one side wall of the cabinet and communicating with the outlet so that air discharged from the machine room is allowed to be moved to the care chamber; a supply port communicating with the supply duct and provided on one side of the care chamber so that air moved through the supply duct is discharged into the care chamber; a separation shelf detachably mounted to the cabinet to form the recovery chamber; and a fragrance emitter holder installed on a bottom surface of the separation shelf so that air to which fragrance is added by the fragrance emitter is supplied to the care chamber through the machine room and the supply duct.

The bottom surface of the separation shelf may face the inlet of the machine room. The bottom surface of the separation shelf may include a first area corresponding to the inlet of the machine room and a second area outside the first area. The fragrance emitter holder may be in the second area.

The recovery chamber may be between the separation shelf and the inlet of the machine room. The separation shelf may include a grille on a front portion of the separation shelf to allow the air from the care chamber to be guided to the inlet of the machine room. The inlet of the machine room may be located behind the grille. The fragrance emitter holder may be disposed behind the grille and lateral to the inlet of the machine room.

Air inside the care chamber may pass through the grille and move rearward in the recovery chamber, fragrance emitted from the fragrance emitter holder may be added to the air. Air to which fragrance is added may be introduced into the machine room through the inlet and exchange heat with the heat exchanger to become hot and dry air with fragrance. The hot and dry air with fragrance may be discharged from the machine room, move through the supply duct, and be supplied into the care chamber through the supply port.

DETAILED DESCRIPTION

Figure 1:
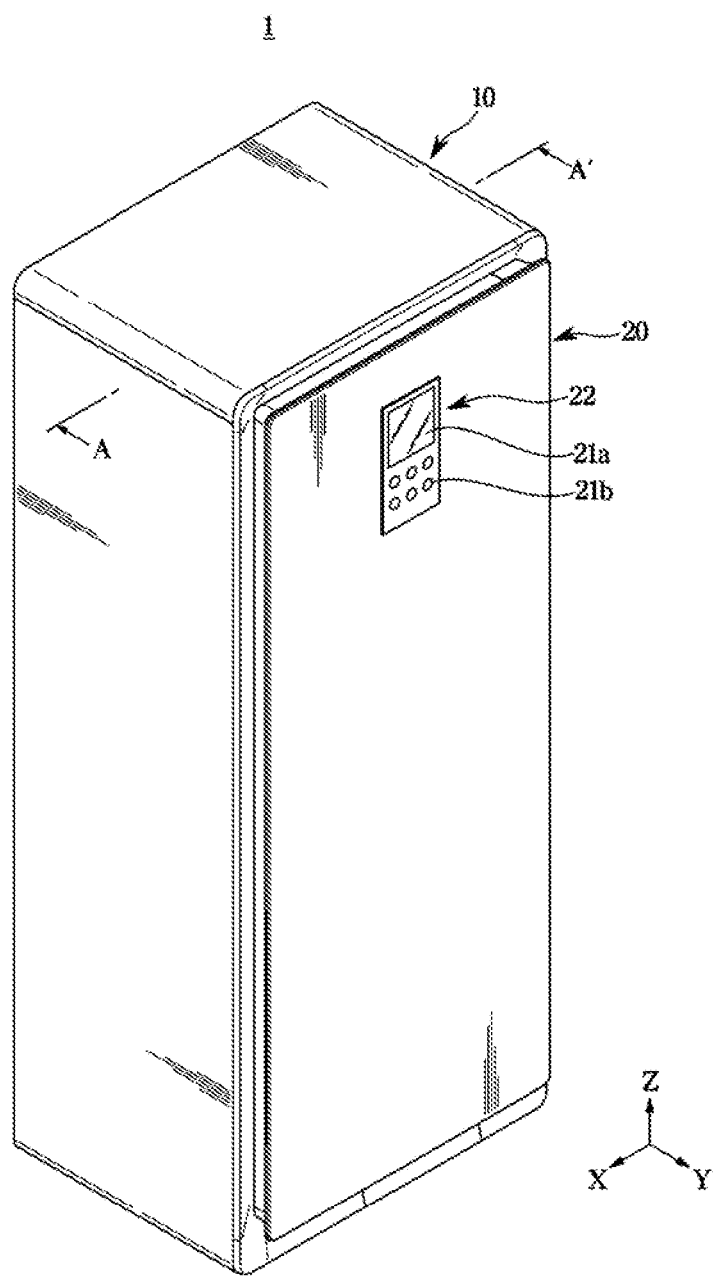
FIG. 1 is a diagram illustrating a shoe care apparatus according to one embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

The disclosure will be described more fully hereinafter with reference to the accompanying drawings. For convenience of description, a shoe care apparatus for caring for shoes is described as an example, but the shoe care apparatus 1 according to one embodiment of the disclosure may be used to care for clothes and/or miscellaneous goods other than shoes. For example, the configuration and/or structure of the shoe care apparatus 1 according to one embodiment of the disclosure may be equally applicable to a clothes care apparatus.

An aspect of the disclosure provides a shoe care apparatus with increased fragrance effectiveness.

Another aspect of the disclosure provides a shoe care apparatus that facilitates introduction and replacement of a fragrance emitter.

According to an aspect of the disclosure, since a shoe care apparatus comprises a fragrance emitter holder disposed to prevent flow degradation as much as possible, thereby increasing the overall fragrance effectiveness of a care chamber.

According to an aspect of the disclosure, a shoe care apparatus comprises a detachable fragrance emitter holder, which facilitates installation and replacement of a fragrance emitter.

Figure 2:
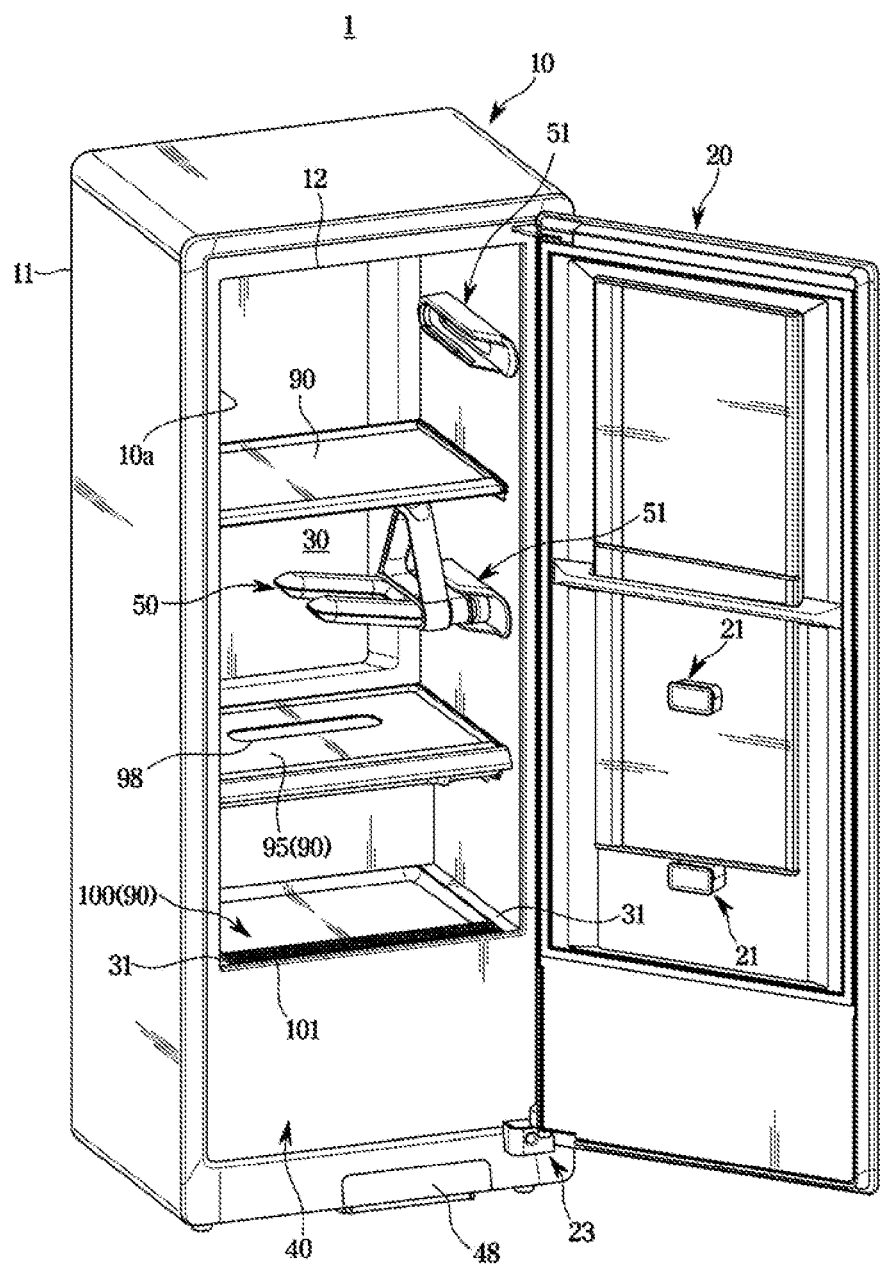
FIG. 2 is a view illustrating a state in which a cabinet door of the shoe care apparatus shown in FIG. 1 is opened.
Figure 3:
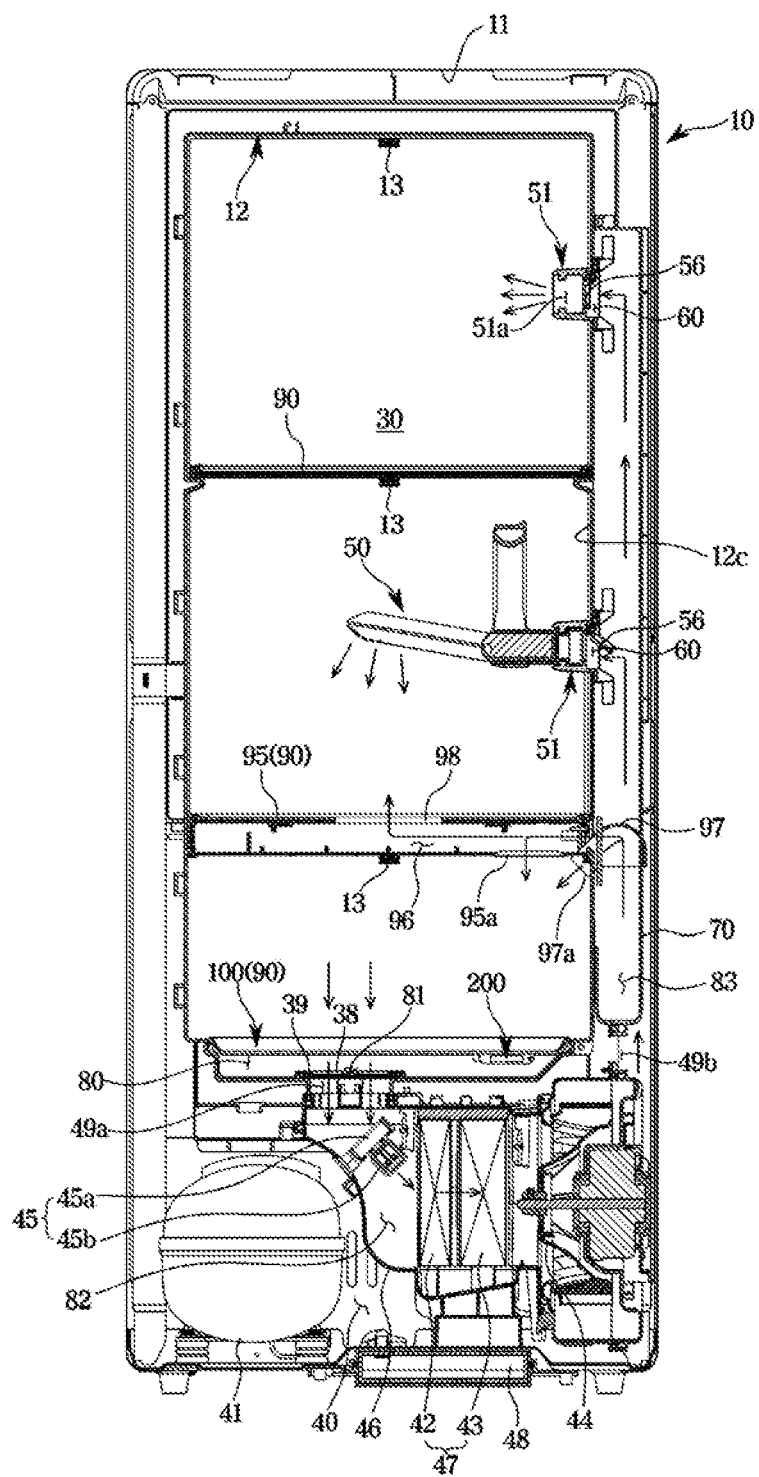
FIG. 3 is a sectional view taken along line A-A' of FIG. 1.

FIG. 1 is a diagram illustrating a shoe care apparatus according to one embodiment of the disclosure. FIG. 2 is a view illustrating a state in which a cabinet door of the shoe care apparatus shown in FIG. 1 is opened. FIG. 3 is a sectional view taken along line A-A' of FIG. 1.

Referring to FIG. 1, a direction along the X-axis may be defined as a left to right direction, a direction along the Y-axis may be defined as a front to rear direction, and a direction along the −Z axis may be defined as an upper to lower direction.

Referring to FIGS. 1 to 3, a shoe care apparatus 1 according to one embodiment of the disclosure may include a cabinet 10 and a cabinet door 20 rotatably coupled to the cabinet 10.

The cabinet 10 may have a rectangular parallelepiped shape with an open front surface. A cabinet opening 10a may be formed in an open front surface of the cabinet 10. The cabinet door 20 may be rotatably coupled to the cabinet 10 to open and close a care chamber 30 formed inside the cabinet 10. The cabinet door 20 may be coupled to the cabinet 10 through a hinge 23.

The cabinet door 20 may include a hanger 21 provided on one surface that faces the inside of the care chamber 30 when the cabinet door 20 closes the care chamber 30. At least one hanger 21 may be provided. The hanger 21 may be provided to allow a supporter 50, which is described below, to be hung thereon, thereby easily storing the supporter 50. The use of the hanger 21 is not limited thereto, and may be used to store other components.

The cabinet door 20 may further include an input device 22 provided on a front surface of the shoe care apparatus 1. A user may set various care courses through the input device 22 based on the type of shoes to be cared. The input device 22 may include a panel 21a and a button 21b. The panel 21a may be touched as an input and display a progress of the care courses, status information of storage items (shoes, clothes, etc.), and the like. In addition, the panel 21a may display status information of fragrance detected by a sensor 13, which will be described below. The panel 21a may display a fragrance emitter replacement notification, which will be described below. Accordingly, a user may easily check status information of the shoe care apparatus 1 through the panel 21a without opening the cabinet door 20.

The cabinet 10 may include an outer case 11 forming an exterior and an inner case 12 disposed inside the outer case 11. The inner case 12 may form the care chamber 30. The care chamber 30 may be provided to accommodate a plurality of shoes, a plurality of clothes, and the like. A machine room 40 may be provided below the care chamber 30 to supply hot and dry air to the care chamber 30.

A flow path may be provided in the cabinet 10 to allow air to circulate the care chamber 30 and the machine room 40.

A supporter 50 configured to support shoes may be provided inside the care chamber 30. The supporter 50 may be installed on one side of the care chamber 30. FIGS. 2 and 3 illustrate that the supporter 50 is located on the right side of the care chamber 30, but the position of the supporter 50 is not limited thereto. Alternatively, the supporter 50 may be located on the left side or on the rear inner side of the care chamber 30. The supporter 50 may be detachably provided in the cabinet 10. At least one supporter 50 may be provided. The supporter 50 may be formed in a shape that may be inserted into a shoe.

A supporter rail 51 supporting the supporter 50 may be provided in the care chamber 30. The supporter 50 may be detachably mounted on the supporter rail 51. The supporter rail 51 is provided on one side of the inner case 12. The supporter rail 51 may be disposed to correspond to a supply port 60 provided on one side of the inner case 12.

The supporter rail 51 may include a rail opening 51a formed to communicate with the supply port 60. The rail opening 51a may be formed to pass through a body of the supporter rail 51. The rail opening 51a may be opened and closed by a supply door 56 provided on the supply port 60 side.

The supporter 50 and the supporter rail 51 may be positioned on one side of the cabinet 10 to communicate with the supply port 60. For example, the supporter 50 and the supporter rail 51 may be located on the right side of the care chamber 30. However, it is not limited thereto, and the supporter 50 and the supporter rail 51 may be located on the left side of the care chamber 30.

Since the supporter 50 may be detachable from the care chamber 30, space in the care chamber 30 may be secured when managing relatively long shoes.

The machine room 40 for dehumidifying or heating air inside the care chamber 30 may be provided in the cabinet 10. The machine room 40 may be located in a lower portion of the cabinet 10. The machine room 40 may be provided below the care chamber 30. A heat exchanger 47 may be disposed in the machine room 40 to exchange heat with air introduced into the machine room 40 so as to supply hot and dry air to the inside of the care chamber.

The machine room 40 may include an inlet 49a through which air is introduced from the care chamber 30, and an outlet 49b through which air is discharged into the care chamber 30. The air introduced through the inlet 49a may be humid air. The air discharged through the outlet 49b may be hot and dry air.

The inlet 49a of the machine room 40 may communicate with a recovery chamber 80. The outlet 49b of the machine room 40 may communicate with a supply duct 70, which will be described below. Further, a filter unit may be disposed on the side of the inlet 49a of the machine room 40. The filter unit may filter out foreign substances in the air flowing into the machine room 40. That is, the filter unit may prevent foreign substances from being introduced into the machine room 40. For example, the filter unit may include a filter frame 39 and a filter 38 mounted on the filter frame 39.

A drain pan 48 detachable from the cabinet 10 may be installed at a lower portion of the cabinet 10. The drain pan 48 may be disposed adjacent to the heat exchanger 47 to easily collect condensed water generated by the heat exchanger 47 (in particular, a condenser 43).

The heat exchanger 47 may be provided to dehumidify and/or heat the air inside the care chamber 30 as needed. The heat exchanger 47 may heat air recovered from the care chamber 30 to provide hot and dry air to the care chamber 30. The heat exchanger 47 may include an evaporator 42 and a condenser 43 through which refrigerant is circulated. The heat exchanger 47 may be provided to dehumidify and/or heat air.

A refrigerant cycle may be formed in the machine room 40. The refrigerant cycle may be formed by circulating refrigerant through a compressor 41, the evaporator 42, an expansion valve (not shown), and the condenser 43. The evaporator 42 may dehumidify air introduced into the machine room 40 by evaporating the refrigerant expanded by the expansion valve (not shown). Further, the condenser 43 may heat air that has passed through the evaporator 42 by condensing the refrigerant compressed by the compressor 41. Accordingly, the air that has passed through the heat exchanger 47 may become hot and dry.

A blower fan 44 may facilitate inflow and outflow of air in the machine room 40. The blower fan 44 may be provided as a centrifugal fan that draws in air in the direction of the axis of rotation and exhausts air in a radial direction. However, the type of the blower fan 44 is not limited thereto, and the blower fan may be provided as an axial flow fan or a mixed flow fan.

A connection flow path 82, through which air passes through the evaporator 42, the condenser 43, and the blower fan 44 flows, may be formed in the machine room 40. The connection flow path 82 may be formed by a connection duct 46. One end of the connection duct 46 may communicate with the care chamber 30. The other end of the connection duct 46 may communicate with the supply duct 70 provided on one side wall of the cabinet 10. The connection duct 46 may be provided to cover at least a portion of the evaporator 42, the condenser 43, and the blower fan 44.

The recovery chamber 80 may be provided between the care chamber 30 and the machine room 40. The recovery chamber 80 is a space divided from the care chamber 30 and may guide air recovered from the care chamber 30 to the machine room 40. Specifically, the recovery chamber 80 may guide the air introduced from the care chamber 30 to the inlet 49a of the machine room 40. One end of the recovery chamber 80 may communicate with the care chamber 30. The other end of the recovery chamber may communicate with the machine room 40. A recovery flow path 81 through which air flows from the care chamber 30 to the machine room 40 may be formed in the recovery chamber 80.

The recovery chamber 80 may be formed by a separation shelf 100, which will be described below. For example, the recovery chamber 80 may be a space separated from the care chamber 30 in the upper to lower direction by mounting the separation shelf 100 to a mounting surface 31 of the inner cabinet 12.

The supply port 60 may be provided in the care chamber 30. The supply port 60 may be located on a side wall of the inner case 12. Particularly, the supply port 60 may be formed on the left side of the of the care chamber 30, in which the supporter 50 is located. However, the position of the supply port 60 is not limited thereto. The supply port 60 may be formed on the right side of the care chamber 30 as long as the position of the supply port corresponds to the position of the supporter 50. At least one supply port 60 may be formed. The supply port 60 may supply hot and dry air that has passed through the heat exchanger 47 of the machine room 40 into the care chamber 30 in order to dry and/or dehumidify shoes. The shape of the supply port 60 may be approximately circular. However, the shape of the supply port is not limited thereto. The supply port may include various other shapes such as squares and polygons.

The connection duct 46 may be provided to be connected to the supply duct 70 and the recovery chamber 80. One end of the connection duct 46 may communicate with the supply duct 70. The inlet 49a of the machine room 40 may be provided at the other end of the connection duct 46. The other end of the connection duct 46 may communicate with the recovery chamber 80. The air introduced into the machine room 40 through a grille 101 of the separation shelf 100 is dehumidified and/or heated by passing through the connection duct 46, and then is discharged back into the care chamber 30 through the supply duct 70 and the supply port 60. This makes it possible to care for (e.g., dry, dehumidify, sterilize, etc.) shoes, clothes, and the like accommodated in the care chamber 30 by the hot and dry air discharged through the supply port 60.

The supply duct 70 may be provided to extend vertically between the outer case 11 and the inner case 12 of the cabinet 10. The supply duct 70 may be located on one side, to which the supporter 50 is mounted, of the cabinet 10. One end of the supply duct 70 may be provided to communicate with the connection duct 46. The other end of the supply duct 70 may be provided to communicate with the supply port 60. The supply duct 70 may form a supply flow path 83 for guiding air discharged from the machine room 40 to the supply port 60.

The shoe care apparatus 1 may further include a water tank (not shown), a steam generator (not shown) configured to generate steam by receiving water from the water tank, and a steam spraying device (not shown) configured to receive steam from the steam generator and spray the steam.

The water tank may be disposed under the care chamber 30. Water in the water tank may be supplied to the steam generator and used to form steam. The water tank may be installed to be detached from the cabinet 10 to facilitate water replenishment.

The steam generator may be disposed in the machine room 40. The steam generator may generate steam and guide the steam to the steam spraying device. The steam generator may be connected to the steam spraying device through a steam supply pipe (not shown).

The shoe care apparatus 1 may further include a deodorizer 45. The deodorizer 45 may be disposed in the machine room 40. The deodorizer 45 may be disposed in the connection duct 46 to remove odors from the air passing through the care chamber 30. In FIG. 3, the deodorizer 45 is illustrated as being located on the left side of the blower fan 44, but is not limited thereto. Alternatively, the deodorizer 45 may be located on the right side of the blower fan 44.

The deodorizer 45 may include a deodorizing filter 45a and a germicidal lamp 45b. The deodorizing filter 45a may include a ceramic filter. The germicidal lamp 45b may include an ultraviolet lamp. However, the deodorizing filter is not limited thereto, and the deodorizing filter 45a may include various filters as long as a filter is configured to remove odors from the air, and the germicidal lamp 45b may also include various devices as long as a device is configured to sterilize germs.

At least one shelf 90 may be provided in the care chamber 30. The shelf 90 may be provided to hold objects to be stored. The supply port 60 and the supporter 50 may be positioned adjacent to the shelf 90.

The shelf 90 may include a duct shelf 95. The duct shelf 95 may include an internal flow path 96 as shown in FIG. 3. The heated air (or hot and dry air) passing through the internal flow path 96 may be sprayed toward objects to be stored from a spray port 95a of the duct shelf 95 and a spray port 97a of a circular duct 97, respectively. In addition, the heated air may pass through the internal flow path 96 and be discharged to the care chamber 30 through a shelf outlet 98. In FIG. 3, the shelf outlet 98 is shown as being provided on an upper side of the duct shelf 95. However, it is not limited thereto, and the shelf outlet 98 may be provided on a lower side of the duct shelf 95.

The shelf 90 may include a separation shelf 100. The separation shelf 100 may form the recovery chamber 80. For example, the separation shelf 100 may be mounted to the mounting surface 31 of the inner cabinet 12 to form the recovery chamber 80 that is partitioned from the care chamber 30. The separation shelf 100 may include a top surface 100a, a bottom surface 100b, and side surfaces 100c. The top surface 100a of the separation shelf 100 may hold shoes, clothes, or the like. The bottom surface 100b of the separation shelf 100 may be disposed to face the inlet 49a of the machine room 40. Further, the bottom surface 100b of the separation shelf 100 may be spaced apart from the inlet 49a of the machine room 40 in the upper to lower direction. The recovery chamber 80 may be formed between the bottom surface 100b of the separation shelf 100 and the inlet 49a of the machine room 40.

Figure 8:
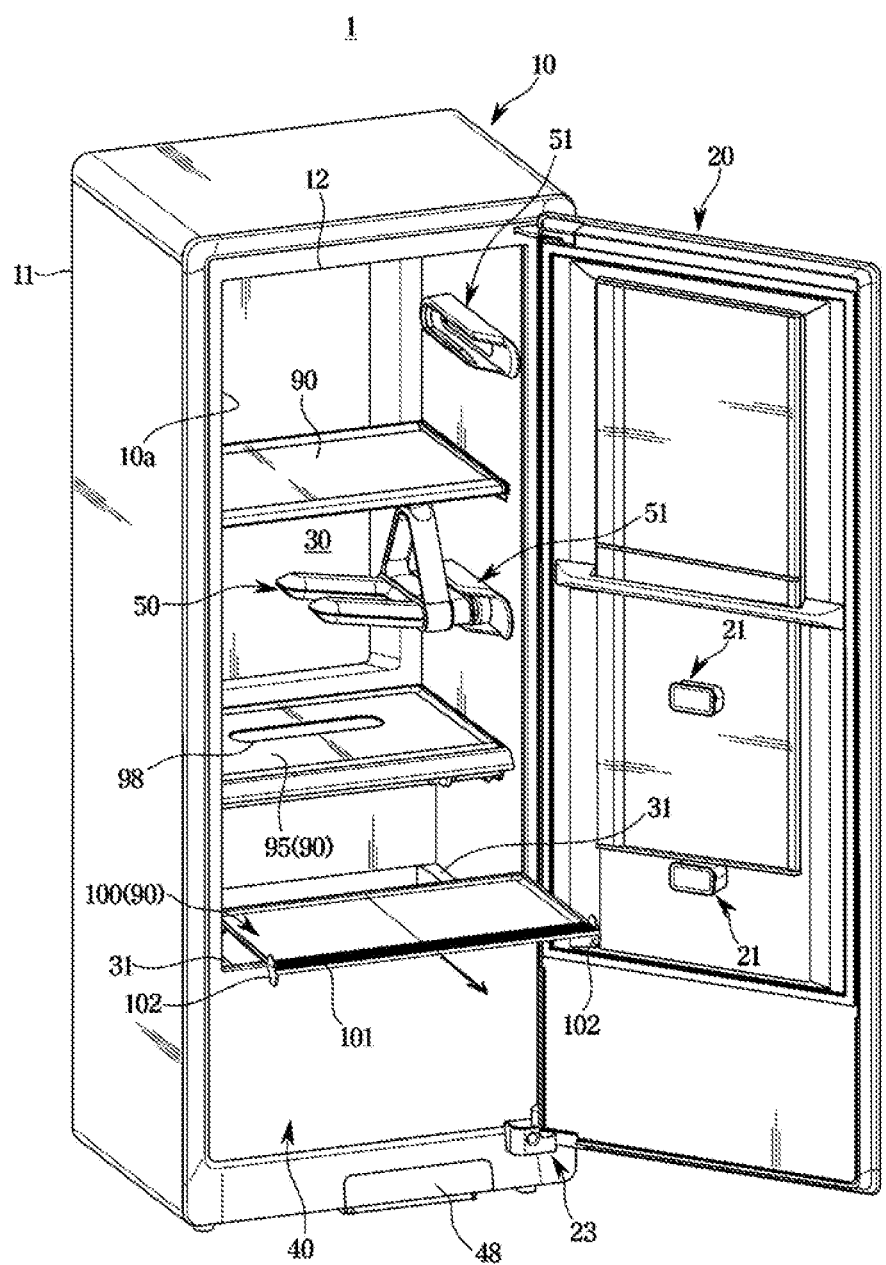
FIG. 8 is a view illustrating a state in which the separation shelf is being separated from the shoe care apparatus shown in FIG. 2.

As shown in FIG. 8, the separation shelf 100 may be detachably mounted to the cabinet 10. That is, the separation shelf 100 may be removably provided to the cabinet 10. In addition, handles (not shown) may be provided on the sides of the separation shelf 100 to facilitate attachment and detachment of the separation shelf.

The grille 101 for recovering air inside the care chamber 30 may be formed in a front portion of the separation shelf 100. The grille 101 may form a recovery port 101a for communicating between the care chamber 30 and the recovery chamber 80.

A flange 102 may be formed on the sides 100c of the separation shelf 100. The flange 102 may include an upper flange 102a and/or a lower flange 102b. The flange 102 may be supported and mounted by the mounting surface 31 formed on the cabinet 10.

The shoe care apparatus 1 may include at least one sensor 13. The sensor 13 may detect fragrance inside the care chamber 30. The shoe care apparatus 1 may display status information of fragrance detected by the sensor 13. Specifically, the panel 21a may display the status information of fragrance detected by the sensor 13. Accordingly, a user may easily check the status information of fragrance visually through the panel 21a without opening the cabinet door 20. Further, the shoe care apparatus 1 may perform a fragrance replacement notification function by recognizing status information of fragrance detected by the sensor 13. For example, if concentration of fragrance is below a certain level, i.e., if the fragrance emitter needs to be replaced, a warning sound may be output or a warning light may be displayed on the panel 21a to make the user aware of this.

Figure 15:
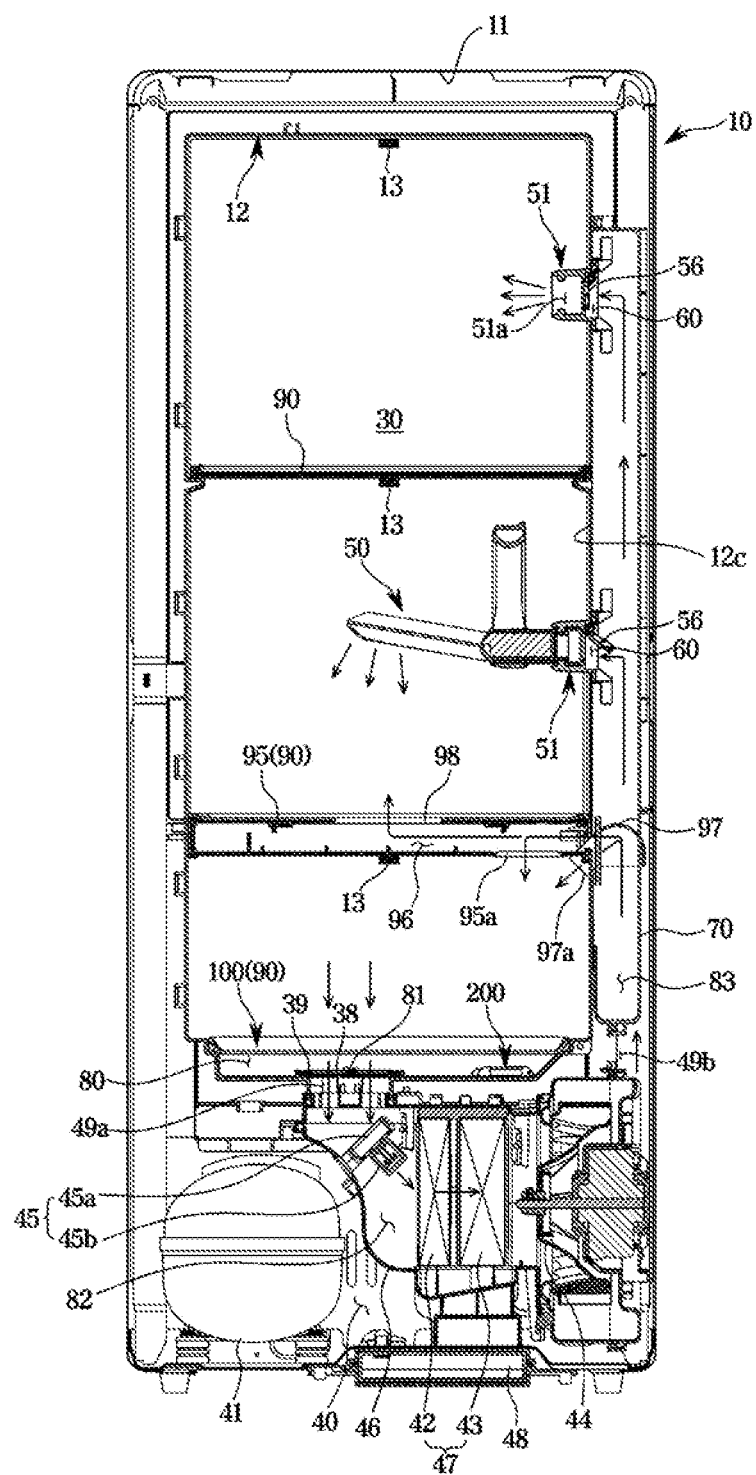
FIG. 15 is a cross-sectional view of a shoe care apparatus according to another embodiment of the disclosure.

Referring to FIGS. 2 and 15, the sensor 13 may be mounted on the care chamber 30 and/or the shelf 90. However, it is not limited thereto, and the sensor may be mounted anywhere as long as it can sense fragrance inside the care chamber 30.

Figure 4:
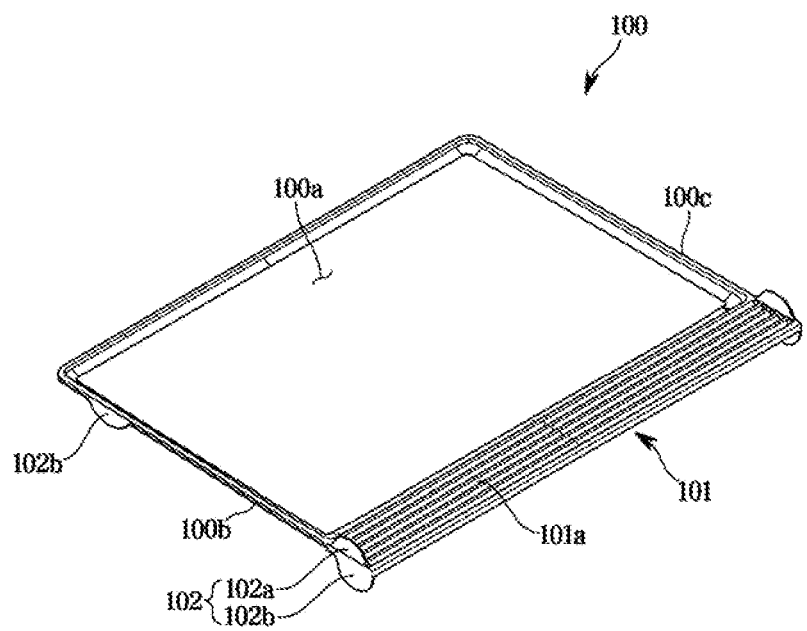
FIG. 4 is a view illustrating a separation shelf shown in FIG. 2.
Figure 5:
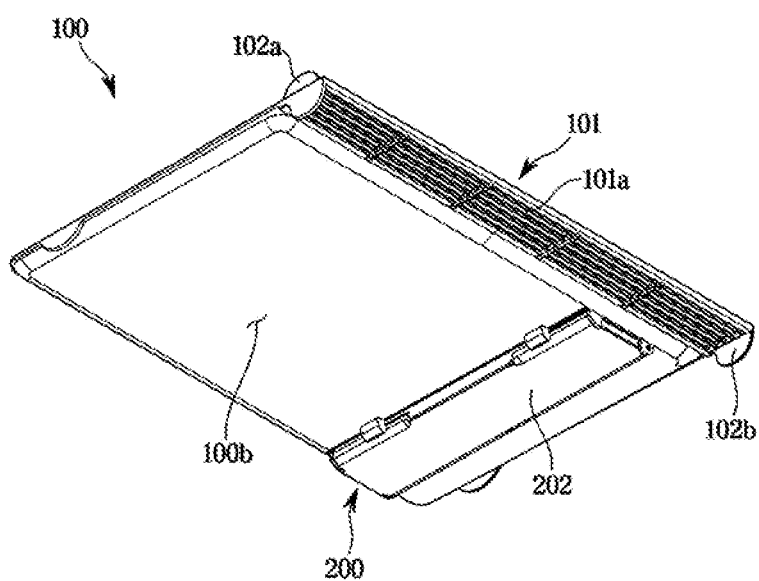
FIG. 5 is a bottom view of the separation shelf shown in FIG. 4.
Figure 6:
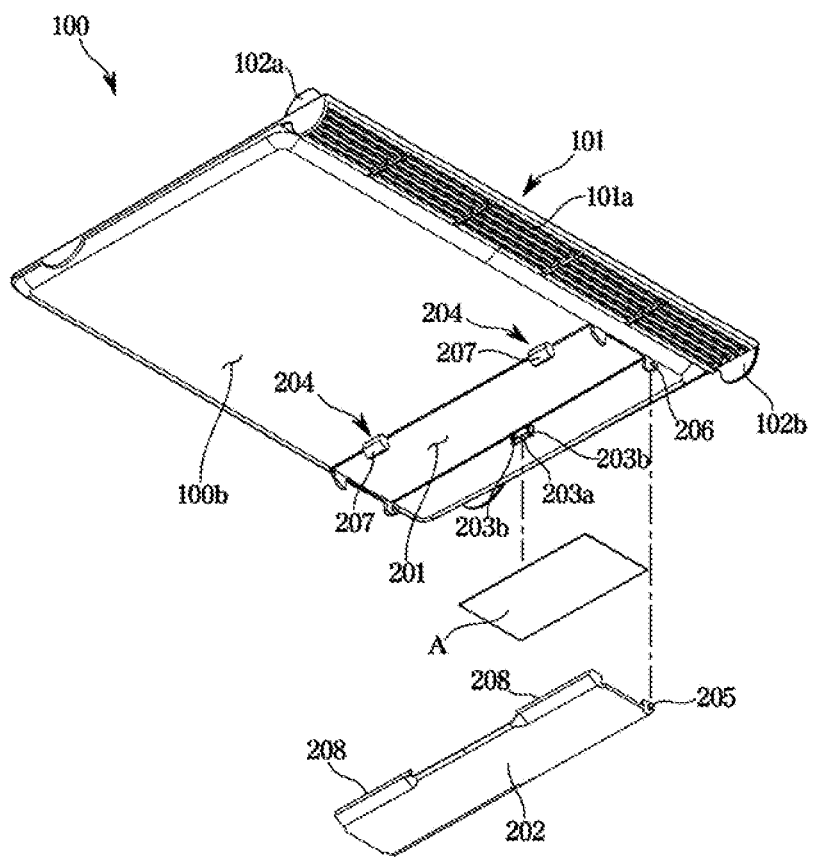
FIG. 6 is a view illustrating a state in which a cover of a fragrance emitter holder is dissembled from the separation shelf shown in FIG. 5.
Figure 7:
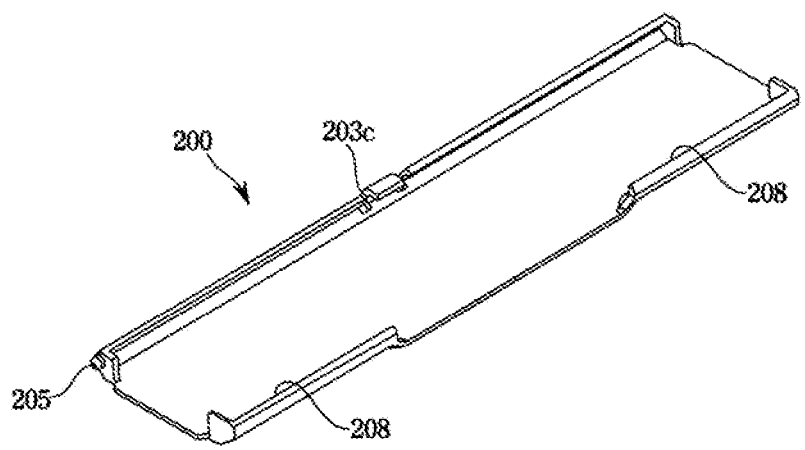
FIG. 7 is a view illustrating the cover of the fragrance emitter holder shown in FIG. 5.

FIG. 4 is a view illustrating the separation shelf shown in FIG. 2. FIG. 5 is a bottom view of the separation shelf shown in FIG. 4. FIG. 6 is a view illustrating a state in which a cover of a fragrance emitter holder is dissembled from the separation shelf shown in FIG. 5. FIG. 7 is a view illustrating the cover of the fragrance emitter holder shown in FIG. 5.

A fragrance emitter holder 200 may accommodate a fragrance emitter A. The fragrance emitter A may be various types of materials that emit fragrance. For example, the fragrance emitter A may be a sheet containing fragrance. The fragrance emitter holder 200 may emit fragrance to the surroundings by accommodating the fragrance emitter A. Specifically, the fragrance emitter holder 200 may add fragrance to air flowing around.

Referring to FIG. 2, the fragrance emitter holder 200 may be disposed in the recovery chamber 80. The air collected from the care chamber 30 flows along the recovery flow path 81 through the recovery chamber 80 and moves to the machine room 40. Thereby, while the air flows in the recovery flow path 81, fragrance may be added to the air by the fragrance emitter holder 200. That is, the fragrance emitter holder 200 is disposed in the recovery chamber 80 so that the fragrance emitted from the fragrance emitter A may be effectively added to the air flowing in the recovery chamber 80. The air to which fragrance is added by the fragrance emitter holder 200 may be supplied to the care chamber 30 while circulating inside the cabinet 10 along the flow path. Accordingly, fragrance may effectively permeate throughout the care chamber 30, and shoes or clothes stored in the care chamber 30 may be scented.

The fragrance emitter holder 200 may be formed on the separation shelf 100. The fragrance emitter holder 200 may be provided to extend along in a front to rear direction of the separation shelf 100. Specifically, as shown in FIG. 5, the fragrance emitter holder 200 may be installed on the bottom surface 100b of the separation shelf 100. Since shoes are placed on the top surface 100a of the separation shelf 100, the fragrance emitter holder 200 installed on the bottom surface 100b of the separation shelf 100 may not be stained with water and foreign substances falling from the shoes. Accordingly, the fragrance emitter A accommodated in the fragrance emitter holder 200 may not be contaminated by water and foreign substances falling from the shoes, and the fragrance effect may last for a long time. In addition, the fragrance emitter holder 200 may be disposed so as not to overlap with the grille 101 of the separation shelf 100.

As shown in FIG. 6, the fragrance emitter holder 200 may include a seating portion 201 on which the fragrance emitter A is seated and a cover 202 to open and close the seating portion 201. For example, the seating portion 201 may be formed on the bottom surface 100b of the separation shelf 100.

The fragrance emitter holder 200 may further include a hinge portion 203. The cover 202 may open and close the seating portion 201 as it rotates around the hinge portion 203.

The hinge portion 203 may include a hinge shaft 203a and hinge shaft supports 203b extending from both ends of the hinge shaft to support the hinge shaft 203a. The hinge shaft support 203b may protrude from the bottom surface 100b of the separation shelf 100. The hinge portion 203 may include a hinge groove 203c formed in the cover 202. The hinge groove 203c may be formed by being bent toward an inside a body of the cover 202. The hinge groove 203c is rotatably coupled to the hinge shaft 203a, and both ends of the hinge groove are caught by the hinge shaft support 203b, so movement may be limited. The hinge shaft 203a and the hinge shaft support 203b may be positioned at a center of the bottom surface 100b of the separation shelf in the front to rear direction. The hinge groove 203c may be located at a center of the cover in a longitudinal direction of the cover 202 to correspond to the hinge shaft 203a. However, it is not limited thereto, and the hinge portion 203c may be provided at a position other than the center of the cover as long as the seating part 201 may be opened and closed by rotation of the hinge portion.

The fragrance emitter holder 200 may further include a coupling portion 204 formed outside the seating portion 201. The coupling portion 204 may be formed on the bottom surface 100b of the separation shelf 100.

The cover 202 may include coupling protrusions 205 protruding from both side ends of the body of the cover in the longitudinal direction of the body of the cover. The coupling portion 204 may include a coupling hole 206 corresponding to the coupling protrusion 205. The coupling protrusion 205 may be rotatably coupled to the coupling hole 206. The cover 202 may open and close the seating portion 201 by rotating in a state in which the coupling protrusion 205 is coupled to the coupling hole 206.

The coupling portion 204 may include a locking protrusion 207 protruding from the bottom surface 100b of the separation shelf 100. The cover 202 may include a locking protrusion corresponding portion 208 corresponding to the locking protrusion 207. The locking protrusion 207 and the locking protrusion corresponding portion 208 may be coupled. When the locking protrusion 207 and the locking protrusion corresponding portion 208 are coupled to each other, the cover 202 covers the seating portion 201 to be set into a locked state. In the locked state, a predetermined gap 209 may be formed in at least a portion between the seating portion 201 and the cover 202. Fragrance of the flagrance emitter A may be emitted through the predetermined gap 209.

Figure 9:
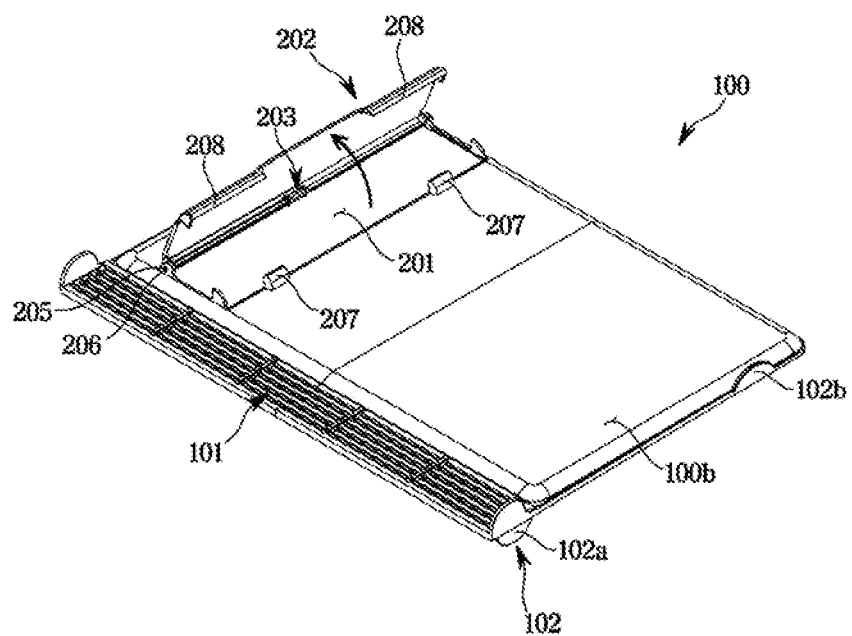
FIG. 9 is a view illustrating a state in which the cover of the fragrance emitter holder shown in FIG. 5 is opened.
Figure 10:
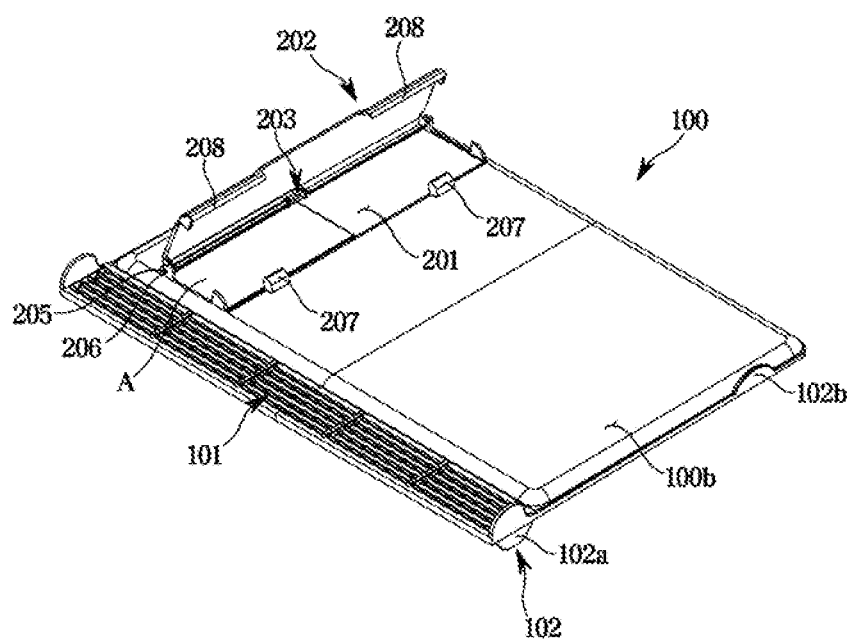
FIG. 10 is a view illustrating a state in which a fragrance emitter is mounted on the fragrance emitter holder shown in FIG. 9.
Figure 11:
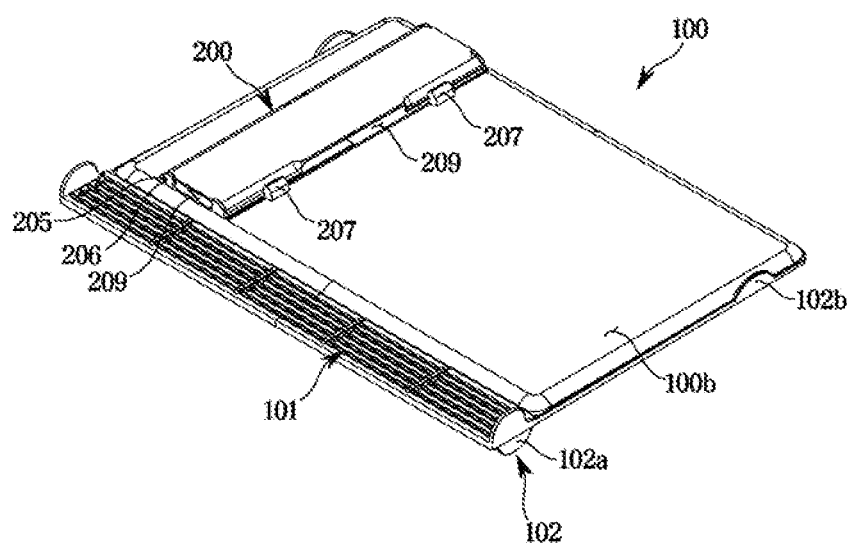
FIG. 11 is a view illustrating a state in which the cover of the fragrance emitter holder shown in FIG. 10 is closed.

A process of installing or replacing the fragrance emitter A will be described. FIG. 8 is a view illustrating a state in which the separation shelf is being separated from the shoe care apparatus shown in FIG. 2. FIG. 9 is a view illustrating a state in which the cover of the fragrance emitter holder shown in FIG. 5 is opened. FIG. 10 is a view illustrating a state in which the fragrance emitter is mounted on the fragrance emitter holder shown in FIG. 9. FIG. 11 is a view illustrating a state in which the cover of the fragrance emitter holder shown in FIG. 10 is closed.

As shown in FIG. 8, the separation shelf 100 may be separated from the cabinet 10. Specifically, the separation shelf 100 may be separated in the front to rear direction or the upper to lower direction.

As shown in FIG. 9, the fragrance emitter holder 200 may be installed on the bottom surface 100b of the separation shelf 100 separated from the cabinet 10. The seating portion 201 may be opened by opening the cover 202 of the fragrance emitter holder 200.

As shown in FIG. 10, a new fragrance emitter A may be seated on the seating portion 201. In this case, the old fragrance emitter may be replaced in the seating portion 201 so that the new fragrance emitter A may be seated. A user may select a fragrance emitter according to his/her preference, and may mount the desired fragrance emitter on the seating portion 201.

As shown in FIG. 11, after the fragrance emitter A is installed or replaced, the cover 202 may be closed so that the seating portion 201 is closed. That is, the fragrance emitter holder 200 is in the locked state. In the locked state, the predetermined gap 209 may be formed in at least a portion between the seating portion 201 and the cover 202. Accordingly, the fragrance emitter A may emit fragrance into the shoe care apparatus 1 through the predetermined gap 209 while being accommodated in the seating portion 201. Specifically, the fragrance emitter A may add fragrance to the air flowing through the recovery flow path 81 formed in the recovery chamber 80.

Thereafter, the fragrance emitter holder 200, on which the new fragrance emitter A is mounted, may be mounted back into the cabinet 10. Specifically, the separation shelf 100 may be mounted in its original position.

As shown in FIGS. 8 to 11, the separation shelf 100 according to one embodiment of the disclosure is detachable from the cabinet 10. The fragrance emitter holder 200 disposed on the lower surface of the separation shelf 100 may easily open and close the seating portion 201 in which the fragrance emitter A is held through the cover 202. With this structure, the shoe care apparatus 1 according to one embodiment of the disclosure facilitates the introduction and/or replacement of the fragrance emitter A.

Figure 12:
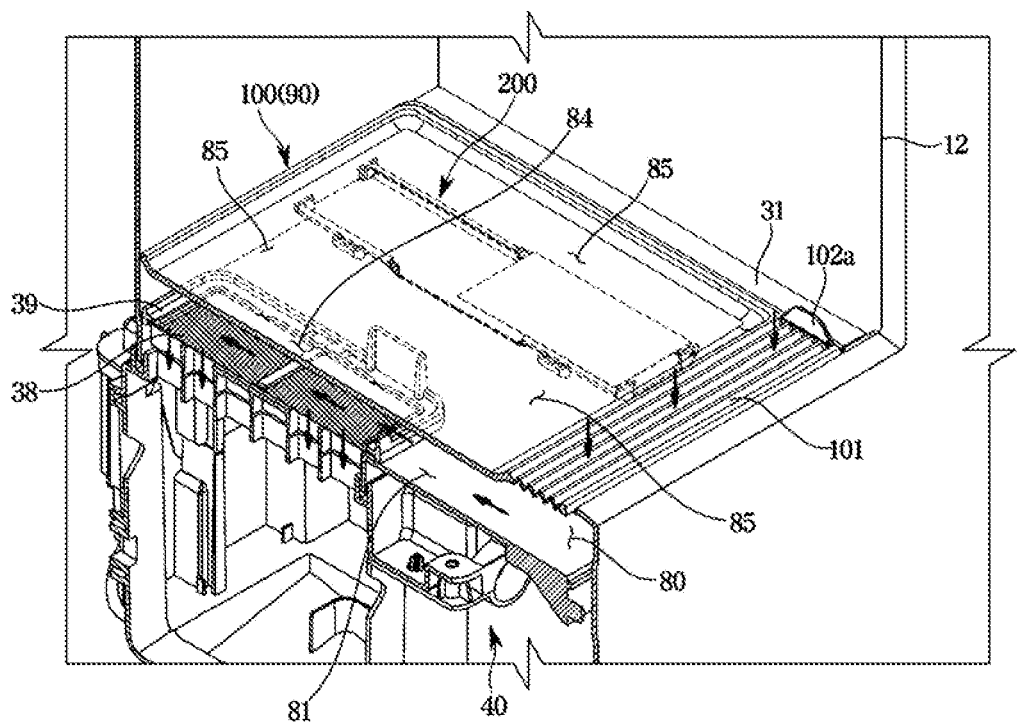
FIG. 12 is a view illustrating a flow of air flowing into a machine room through a care chamber in a shoe care apparatus according to an embodiment of the disclosure.
Figure 13:
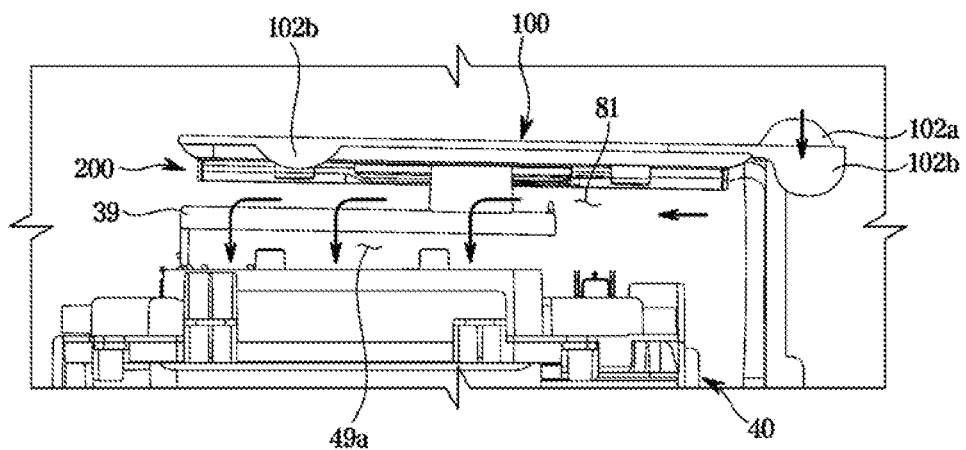
FIG. 13 is a side view illustrating the flow of air shown in FIG. 12.
Figure 14:
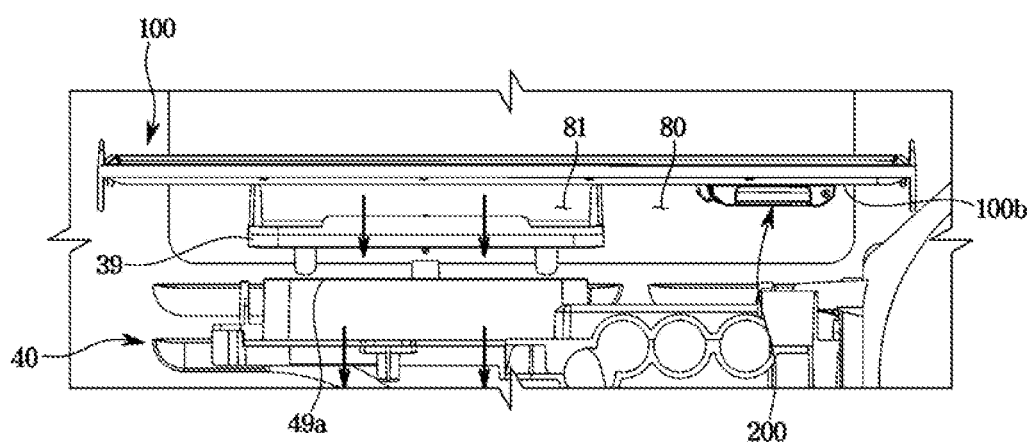
FIG. 14 is a front view illustrating the flow of air shown in FIG. 12.

Next, the flow of air and the arrangement characteristics of the fragrance emitter holder 200 will be described. FIG. 12 is a view illustrating the flow of air flowing into the machine room through the care chamber in the shoe care apparatus according to an embodiment of the disclosure. FIG. 13 is a side view illustrating the flow of air shown in FIG. 12. FIG. 14 is a front view illustrating the flow of air shown in FIG. 12.

The flow path may be provided in the cabinet 10 to circulate air through the care chamber 30 and the machine room 40. The flow path may include a first passage formed inside the recovery chamber 80, a second passage formed inside the machine room 40, and a third passage formed inside the supply duct 70. Air inside the cabinet 10 may circulate through the flow path. Specifically, the air may circulate through the first passage, the second passage, the third passage, and the care chamber 30. The first passage may be the recovery flow path 81. The second passage may be the connection flow path 82. The third passage may be the supply flow path 83. In addition, the flow path may include the internal flow path 96 formed by the duct shelf 95.

Air that dried and/or dehumidified the shoes or the like in the care chamber 30 may contain a large amount of moisture and may move to the recovery chamber 80 through the grille 101. The air may be guided to the inlet 49a of the machine room 40 while moving along the recovery flow path 81.

In this case, the grille 101 may be formed on the front portion of the separation shelf 100. The fragrance emitter holder 200 may be installed on the bottom surface 100b of the separation shelf 100. The fragrance emitter holder 200 may be installed behind the grille 101 so as not to cover the grille 101 of the separation shelf 100. The inlet 49a of the machine room 40 may be located behind the grille 101. With this structure, air returned to the recovery chamber 80 may flow rearward along the recovery flow path 81. Further, the fragrance emitter holder 200 may be formed to elongate in the front to rear direction to correspond to a direction of movement of air. Accordingly, the fragrance emitted from the fragrance emitter holder 200 may be effectively added to the air flowing along the recovery flow path 81.

In particular, the fragrance emitter holder 200 may be provided on the flow path and disposed at a position that does not obstruct the flow of air. The fragrance emitter holder may be provided as a compact structure.

For example, the bottom surface 100b of the separation shelf 100 may be spaced apart from the inlet 49a of the machine room 40 by a predetermined distance in the vertical direction so as to face the inlet 49a of the machine room 40. Accordingly, the fragrance emitter holder 200 formed on the bottom surface 100b of the separation shelf 100 may be spaced apart from the inlet 49a of the machine room 40 by a predetermined distance in the upper to lower direction. The fragrance emitter holder 200 may be spaced apart from the inlet 49a of the machine room 40 by a predetermined distance in the left to right direction.

For example, the bottom surface 100b of the separation shelf 100 may include a first area 84 corresponding to the inlet 49a of the machine room and a second area 85 outside the first area. In this case, the fragrance emitter holder 200 may be disposed in the second area 85.

According to this arrangement, while air recovered from the care chamber 30 moves along the recovery flow path 81 toward the inlet 49a of the machine room 40, the fragrance emitter holder 200 may not obstruct the flow of air. In other words, it is possible to add fragrance to the air while maximally preventing flow degradation occurring on the flow path.

Air to which fragrance is added in the recovery chamber 80 may be introduced into the machine room 40 through the inlet 49a of the machine room 40. As the air introduced into the machine room 40 exchanges heat with the heat exchanger 47, the air may be heated, and moisture contained in the air may be removed. The hot and dry air that has passed through the heat exchanger 47 may be discharged to the supply duct 70 through the outlet 49b of the machine room 40. The hot and dry air discharged from the machine room 40 may move upward along the supply flow path 83 provided in the supply duct 70 and may be discharged into the care chamber 30 through the supply port 60.

In addition, the hot and dry air discharged from the machine room 40 may be discharged into the care chamber 30 through the supporter 50 mounted on the supporter rail 51. Specifically, the hot and dry air may pass through the opening 51a of the supporter rail 51 and be discharged through an injection hole formed in the body of the supporter 50 (see FIG. 2). In this case, when shoes or clothes are placed on the supporter 50, air to which fragrance is added may be directly sprayed onto the shoes or clothes placed on the supporter 50. Accordingly, fragrance may permeate more effectively into shoes or clothes.

Meanwhile, the hot and dry air discharged from the machine room 40 may pass through the internal passage 96 and may be discharged into the care chamber 30 through the spray port 95a of the duct shelf 95 and/or the shelf outlet 98. In addition, the hot and dry air discharged from the machine room 40 may be discharged through the spray port 97a of the circular duct 97.

As mentioned above, as the air to which fragrance is added is discharged into the care chamber 30 through several paths, the fragrance effect of the shoe care apparatus 1 may be improved. In addition, fragrance may permeate evenly throughout the care chamber 30 without being concentrated to a portion of the care chamber 30.

The hot and dry air discharged into the care chamber 30 may dry and/or dehumidify shoes or the like accommodated in the care chamber 30. In addition, air that dried and/or dehumidified the shoes or the like in the care chamber 30 may contain a large amount of moisture and may be returned to the recovery chamber 80 through the grille 101. The above process may be repeated and the fragrance of the fragrance emitter A may be diffused throughout the care chamber 30.

That is, in the shoe care apparatus 1 according to the disclosure, air with fragrance is repeatedly supplied to the inside of the care chamber 30 through air circulation, so that the fragrance effect of the shoe care apparatus may be increased.

Meanwhile, a shoe care apparatus according to another embodiment of the disclosure will be described. FIG. 15 is a cross-sectional view of the shoe care apparatus according to another embodiment of the disclosure.

As shown in FIG. 15, the fragrance emitter holder 200 may be disposed in the recovery chamber 80. However, unlike the above-described embodiment, the fragrance emitter holder 200 may not be installed on the bottom surface of the separation shelf 100, but the fragrance emitter holder 200 may be installed in the inner case 12 of the cabinet 10 provided in the recovery chamber 80. However, it is not limited thereto, and the fragrance emitter holder 200 may be placed anywhere in the recovery chamber 80 as long as it does not obstruct the flow of air moving toward the inlet 49a of the machine room 40. Other configurations except for the arrangement of the fragrance emitter holder 200 may be the same as those of the above-described embodiment. On the other hand, since the fragrance emitter holder 200 may be detachably mounted on the inner case 12 to facilitate mounting and/or replacement the fragrance emitter A.

While the disclosure has been particularly described with reference to exemplary embodiments, it should be understood by those of skilled in the art that various changes in form and details may be made without departing from the spirit and scope of the disclosure.

The invention claimed is:

1. A shoe care apparatus, comprising:
   a cabinet;
   a care chamber inside the cabinet;
   a machine room to supply air to the care chamber and including an inlet through which air is introducible and an outlet through which air is dischargeable, so as to allow air to circulate the care chamber and the machine room through a flow path;
   a recovery chamber configured to allow air from the care chamber to be guided to the inlet of the machine room and be introduced into the machine room; and
   a fragrance emitter holder in the recovery chamber to accommodate a fragrance emitter configured to add fragrance to the air from the care chamber that is guided through the recovery chamber, so that the air to which the fragrance is added by the fragrance emitter is supplied to the care chamber through the flow path.

2. The shoe care apparatus of claim 1, further comprising a separation shelf detachably mounted to the cabinet to form the recovery chamber, and
   wherein the fragrance emitter holder is installed on a bottom surface of the separation shelf.

3. The shoe care apparatus of claim 2, wherein the bottom surface of the separation shelf is spaced apart from the inlet of the machine room by a distance in an upper to lower direction of the cabinet so as to face the inlet of the machine room.

4. The shoe care apparatus of claim 2, wherein the bottom surface of the separation shelf includes a first area corresponding to the inlet of the machine room and a second area outside the first area, and
   wherein the fragrance emitter holder is in the second area.

5. The shoe care apparatus of claim 4, wherein the fragrance emitter holder is spaced apart from the inlet of the machine room by a distance in a left to right direction of the cabinet.

6. The shoe care apparatus of claim 2, wherein the separation shelf includes a grille on a front portion of the separation shelf to allow the air from the care chamber to be guided to the inlet of the machine room.

7. The shoe care apparatus of claim 6, wherein the inlet of the machine room is located behind the grille, and
   wherein as the air inside the care chamber is allowed to pass through the grille and be guided to move rearward in the recovery chamber to the inlet of the machine room, the fragrance emitted from the fragrance emitter holder is allowed to be added to the air, and the air with fragrance is allowed to be introduced into the machine room through the inlet of the machine room.

8. The shoe care apparatus of claim 2, wherein the fragrance emitter holder extends in a front to rear direction of the bottom surface of the separation shelf.

9. The shoe care apparatus of claim 1, further comprising a supply duct configured to move air discharged from the outlet of the machine room to the care chamber, the supply duct included on a side wall of the care chamber and having an end for the air to flow from the outlet of the machine room and an other end for the air to flow to the care chamber, wherein the flow path includes:
a first passage inside the recovery chamber;
a second passage inside the machine room; and
a third passage inside the supply duct,
wherein air inside the cabinet is allowed to circulate through the first passage, the second passage, the third passage, and the care chamber.

10. The shoe care apparatus of claim 1, wherein the fragrance emitter holder includes:
a seating portion on which the fragrance emitter is to be seated; and
a cover to open and close the seating portion.

11. The shoe care apparatus of claim 10, wherein the fragrance emitter holder further includes a hinge portion, and
wherein the cover opens and closes the seating portion by being rotatable around the hinge portion.

12. The shoe care apparatus of claim 11, further comprising a coupling portion formed outside the seating portion,
wherein the coupling portion includes a locking protrusion protruding from a bottom surface of a separation shelf detachably mounted to the cabinet to form the recovery chamber,
wherein the cover includes a locking protrusion corresponding portion corresponding to the locking protrusion,
wherein when the locking protrusion and the locking protrusion corresponding portion are coupled, the cover covers the seating portion to be set into a locked state, and in the locked state, a gap is in at least a portion between the seating portion and the cover.

13. The shoe care apparatus of claim 1, wherein the cabinet includes an outer case and an inner case, and
wherein the fragrance emitter holder is detachably mounted on the inner case in the recovery chamber.

14. The shoe care apparatus of claim 1, further comprising at least one sensor to detect fragrance inside the care chamber.

15. The shoe care apparatus of claim 14, wherein the at least one sensor allows the shoe care apparatus to provide a fragrance replacement notification function based on status information of the fragrance detected by the at least one sensor.

* * * * *